United States Patent
Abe et al.

(10) Patent No.: US 9,755,274 B2
(45) Date of Patent: Sep. 5, 2017

(54) NON-AQUEOUS ELECTROLYTE SECONDARY BATTERY AND ASSEMBLY THEREOF

(71) Applicant: TOYOTA JIDOSHA KABUSHIKI KAISHA, Toyota-shi, Aichi (JP)

(72) Inventors: Takeshi Abe, Toyota (JP); Toshiyuki Kawai, Nagoya (JP); Akira Koyama, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 221 days.

(21) Appl. No.: 14/684,522

(22) Filed: Apr. 13, 2015

(65) Prior Publication Data

US 2015/0311563 A1 Oct. 29, 2015

(30) Foreign Application Priority Data

Apr. 24, 2014 (JP) ................. 2014-090692

(51) Int. Cl.

| | |
|---|---|
| H01M 10/0567 | (2010.01) |
| H01M 10/0569 | (2010.01) |
| H01M 4/525 | (2010.01) |
| H01M 4/62 | (2006.01) |
| H01M 4/505 | (2010.01) |
| H01M 4/131 | (2010.01) |
| H01M 10/0525 | (2010.01) |
| H01M 4/02 | (2006.01) |

(52) U.S. Cl.
CPC ....... *H01M 10/0567* (2013.01); *H01M 4/131* (2013.01); *H01M 4/505* (2013.01); *H01M 4/525* (2013.01); *H01M 4/62* (2013.01); *H01M 10/0525* (2013.01); *H01M 10/0569* (2013.01); *H01M 2004/028* (2013.01); *H01M 2300/0037* (2013.01)

(58) Field of Classification Search
CPC ......... H01M 10/0525; H01M 10/0567; H01M 10/0569; H01M 2004/028; H01M 2300/0037; H01M 4/131; H01M 4/505; H01M 4/525; H01M 4/62
See application file for complete search history.

(56) References Cited

U.S. PATENT DOCUMENTS

| | | | |
|---|---|---|---|
| 2008/0241694 A1 | 10/2008 | Kaiduka et al. | |
| 2009/0181311 A1 | 7/2009 | Iwanaga et al. | |
| 2010/0129714 A1* | 5/2010 | Toyama ................. | H01M 4/485 429/223 |
| 2012/0034503 A1 | 2/2012 | Toyama et al. | |
| 2014/0017576 A1 | 1/2014 | Kim et al. | |
| 2014/0023934 A1 | 1/2014 | Otsuki et al. | |
| 2014/0308578 A1 | 10/2014 | Onizuka et al. | |
| 2016/0293936 A1 | 10/2016 | Takebayashi | |

FOREIGN PATENT DOCUMENTS

| | | |
|---|---|---|
| CN | 101276935 A | 10/2008 |
| CN | 103443992 A | 12/2013 |
| CN | 105745774 A | 7/2016 |
| JP | 2001043859 A | 2/2001 |
| JP | 2003-173770 A | 6/2003 |
| JP | 2003308842 A | 10/2003 |
| JP | 200532712 A | 2/2005 |
| JP | 2007128723 A | 5/2007 |
| JP | 2009-245828 A | 10/2009 |
| JP | 2012-38534 A | 2/2012 |
| JP | 2012243461 A | 12/2012 |
| JP | 2013-89445 A | 5/2013 |
| KR | 1020090017535 A | 2/2009 |
| KR | 10-2014-0015700 A | 2/2014 |
| WO | 2013/005502 A1 | 1/2013 |

OTHER PUBLICATIONS

I. A. Shkrob, Y. Zhu, T. W. Marin, D. P. Abraham. Mechanistic Insight into the Protective Action of Bis(oxalato)borate and Difluoro(oxalate)borate Anions in Li-Ion Batteries, J. Phys. Chem. C 2013, 117, 23750-23756.*

X. Wu, S. Wang, X. Lin, G. Zhong, Z. Gong, Y. Yang. Promoting long-term cycling performance of high-voltage Li2CoPO4F by the stabilization of electrode/electrolyte interface, J. Mater. Chem. A, 2014, 2, 1006.*

S. Dalavi, M. Xu, B. Knight, B. L. Lucht. Effect of Added LiBOB on High Voltage (LiNi0.5Mn1.5O4) Spinel Cathodes, Electrochemical and Solid-State Letters, 15 (2) A28-A31 (2012).*

J. Chong, S. Xun, X. Song, G. Liu, V. S.Battaglia. Surface stabilizedLiNi0.5Mn1.5O4 cathode materials withhigh-rate capability and long cycle life forlithium ion batteries, Nano Energy(2013) 2, 283-293.*

* cited by examiner

*Primary Examiner* — Carlos Barcena
(74) *Attorney, Agent, or Firm* — Sughrue Mion, PLLC

(57) ABSTRACT

Provided is a non-aqueous electrolyte secondary battery combining excellent input/output performance with great durability (cycle characteristics) and an assembly thereof. The present invention provides a non-aqueous electrolyte secondary battery assembly. The positive electrode has a maximum operating voltage of 4.3 V or higher relative to lithium metal, comprising a positive electrode active material and an ion-conductive inorganic phosphate compound. The non-aqueous electrolyte solution comprises a supporting salt, an oxalatoborate-type compound, and a non-aqueous solvent. The non-aqueous solvent is formed of a non-fluorinated solvent. This invention also provides a non-aqueous electrolyte secondary battery obtained by charging the non-aqueous electrolyte secondary battery assembly.

18 Claims, 1 Drawing Sheet

[Fig. 1]
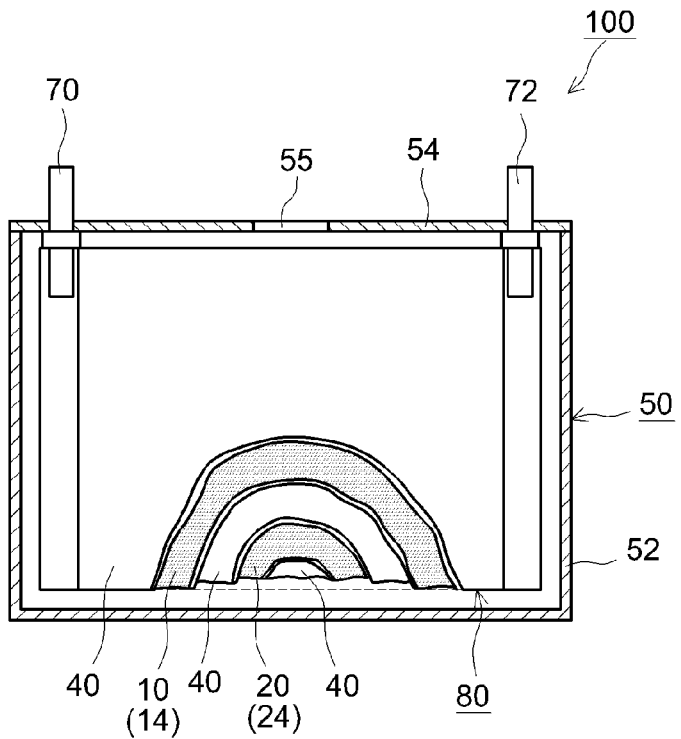
[Fig. 2]
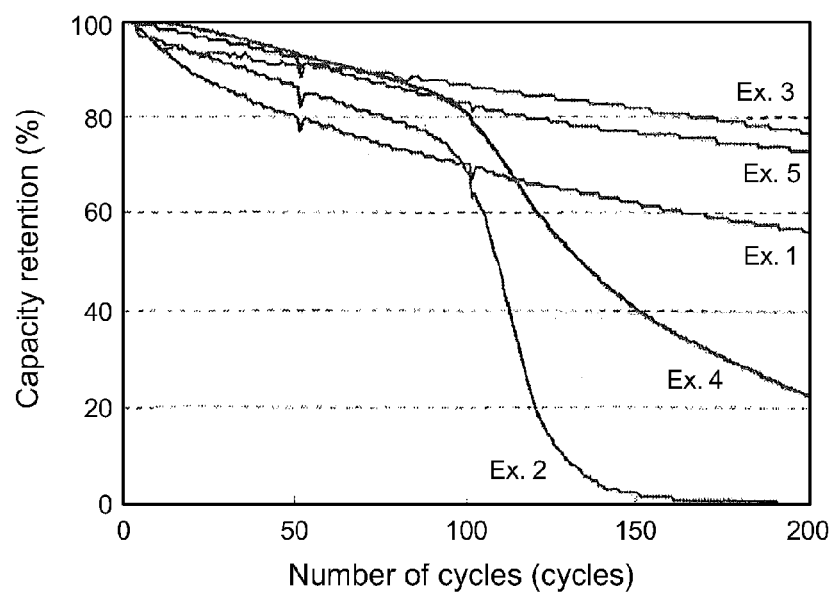

NON-AQUEOUS ELECTROLYTE SECONDARY BATTERY AND ASSEMBLY THEREOF

TECHNICAL FIELD

The present invention relates to a non-aqueous electrolyte secondary battery and an assembly thereof. In particular, it relates to the battery having a positive electrode whose maximum operating voltage is 4.3 V or higher relative to lithium metal.

The present application claims priority based on Japanese Patent Application No. 2014-090692 filed on Apr. 24, 2014 of which the entire contents are incorporated herein by reference.

BACKGROUND ART

With respect to non-aqueous electrolyte secondary batteries such as lithium-ion secondary batteries, etc., as part of performance enhancement, studies are underway to obtain higher energy densities. A higher energy density can be attained, for instance, by setting the operating voltage of positive electrode higher than a conventional one. However, when the maximum operating voltage of positive electrode is set at or above approximately 4.3 V relative to lithium metal, the high positive electrode potential is likely to cause oxidative decomposition of the electrolyte solution at the positive electrode. As a result, the durability (e.g. cycle characteristics at high temperatures) of the battery may deteriorate.

As a means to deal with such an issue, in a known technique, a fluorinated solvent (fluorine-containing solvent) is included in a non-aqueous electrolyte solution to increase the oxidation potential of the non-aqueous electrolyte solution. This means allows for inhibition of oxidative decomposition of the non-aqueous electrolyte solution at a high voltage.

As another means, Patent Document 1 teaches to coat surfaces of positive electrode active material particles with lithium-ion-conductive glass. According to Patent Document 1, this allows for inhibition of oxidative decomposition of a non-aqueous electrolyte solution at a high voltage. As a result, self-discharge characteristics may improve and battery swelling may be reduced when left standing at a high temperature.

CITATION LIST

Patent Literature

[Patent Document 1] Japanese Patent Application Publication No. 2003-173770
[Patent Document 2] Japanese Patent Application Publication No. 2013-89445
[Patent Document 3] Japanese Patent Application Publication No. 2009-245828
[Patent Document 4] International Publication No. 2013/005502
[Patent Document 5] Japanese Patent Application Publication No. 2012-38534

SUMMARY OF INVENTION

In applying these techniques to a battery (e.g. a vehicle battery) requiring a high output density and great durability in a wide temperature range (e.g. −30° C. to 80° C.), there has been some room for further improvement. That is, for instance, when a fluorinated solvent is included in a non-aqueous electrolyte solution, the viscosity of the non-aqueous electrolyte solution may increase especially in a low temperature environment, leading to a higher resistance (e.g. charge transfer resistance). For instance, when surfaces of positive electrode active material particles are coated with lithium-ion-conductive glass, the electron conductivity may be impaired, resulting in a higher resistance of positive electrode. In addition to this, studies by the present inventors have newly revealed that an unusual deterioration trend appears in cycle characteristics in a battery that comprises a positive electrode having a lithium-ion-conductive compound and a non-aqueous electrolyte solution using a non-fluorinated solvent. In particular, for instance, it has been found that repeated charging and discharging in a high temperature environment would cause a rapid decrease of capacity retention rate after 100 cycles.

The present invention was made in view of these circumstances. An objective thereof is to provide a high energy density, non-aqueous electrolyte secondary battery having a positive electrode whose maximum operating voltage is 4.3 V or higher relative to lithium metal, with the battery combining excellent input and output characteristics with great durability.

The present inventors have conducted various studies to come up with a battery constitution that combines low resistance with great durability. As a result of earnest investigations, they have come to make the present invention.

The non-aqueous electrolyte secondary battery assembly disclosed herein comprises a positive electrode, a negative electrode, and a non-aqueous electrolyte solution. The positive electrode has a maximum operating voltage of 4.3 V or higher relative to lithium metal, comprising a positive electrode active material and an ion-conductive inorganic phosphate compound. The non-aqueous electrolyte solution comprises a supporting salt, an oxalatoborate-type compound, and a non-aqueous solvent. The non-aqueous solvent is formed of a non-fluorinated solvent.

With the maximum operating voltage of positive electrode being 4.3 V or higher, the potential difference (voltage) between the positive and negative electrodes can be increased, and a battery can be obtained with a high energy density. With the inorganic phosphate compound in itself being included in the positive electrode, it is possible to inhibit the increase in resistance of positive electrode while inhibiting deterioration of the positive electrode active material (typically, dissolution of a constituent metal). The use of the non-fluorinated non-aqueous solvent can reduce the charge transfer resistance as compared to a battery using a fluorinated non-aqueous solvent. As a result, it can bring about a lower battery resistance (especially in a low temperature environment). In addition, the inclusion of the oxalatoborate-type compound in the non-aqueous electrolyte solution can prevent the aforementioned unusual deterioration of cycle characteristics.

An assembly having this constitution can thus bring about a non-aqueous electrolyte secondary battery combining a high energy density, excellent input and output characteristics and great durability at a high level.

In the present description, the term "assembly" refers to an assembly of battery components as those described above (i.e. a positive electrode, a negative electrode and a non-aqueous electrolyte solution) prior to initial charging.

As used herein, the term "oxalatoborate-type compound" refers to a general oxalato-complex having a four-coordinate structure with at least one oxalate ion ($C_2O_4^{2-}$) coordinating to boron (B) as the central atom.

The operating voltage of positive electrode can be measured, for instance, as follows: A positive electrode subject to measurement is first obtained. Using the positive electrode as a working electrode (WE), a three-electrode cell is constructed with a lithium metal piece as a counter electrode (CE) and another lithium metal piece as a reference electrode (RE). Based on the theoretical capacity of the cell, the SOC (state of charge) is then adjusted by a 5% increment from 0% to 100%. The SOC can be adjusted, for instance, by applying a charge across the WE and CE with a general charging/discharging device, a potentiostat, etc. The cell is subjected to a measurement of voltage across WE and CE after adjusted to each SOC value. The resulting voltage can be considered as the operating voltage (vs. $Li/Li^+$) of the positive electrode at that particular SOC.

Other related conventional art documents include Patent Documents 2 to 5.

In a preferable embodiment of the non-aqueous electrolyte secondary battery assembly disclosed herein, the oxalatoborate-type compound is a compound represented by the next general formula (1): $A^+[BX_{4-2n}(C_2O_4)_n]^-$ (A is an alkali metal, X is a halogen, and n is 1 or 2). In particular, it is preferable that in the formula (1), A is a lithium (Li) (i.e. $A^+$ is a lithium ion ($Li^+$)) and X is a fluorine (F). Specific examples include lithium difluoro(oxalato)borate (LiDFOB) and lithium bis(oxalato)borate (LiBOB). Among these, LiDFOB is especially preferable.

The oxalatoborate-type compound content in the entire non-aqueous electrolyte solution can be, for instance, 0.1% by mass or greater, but 5% by mass or less.

In a preferable embodiment of the non-aqueous electrolyte secondary battery assembly disclosed herein, the inorganic phosphate compound is a phosphate salt comprising an alkali metal. A preferable example is $Li_3PO_4$. The inorganic phosphate compound content can be 0.5 part by mass or greater, but 5 parts by mass or less, with the positive electrode active material being 100 parts by mass.

In a preferable embodiment of the non-aqueous electrolyte secondary battery assembly disclosed herein, the positive electrode active material comprises a spinel lithium nickel manganese composite oxide. This can combine an energy density with durability at a higher level.

In a preferable embodiment of the non-aqueous electrolyte secondary battery assembly disclosed herein, the non-fluorinated solvent comprises a cyclic carbonate and an acyclic carbonate. This can provide at least one effect of increased oxidation resistance, reduced viscosity of the non-aqueous electrolyte solution or increased ionic conductivity. Preferable examples of the non-fluorinated cyclic carbonate include ethylene carbonate (EC), vinylene carbonate (VC) and propylene carbonate (PC). Preferable examples of the non-fluorinated acyclic carbonate include dimethyl carbonate (DMC), diethyl carbonate (DEC) and ethyl methyl carbonate (EMC).

In the present description, the term "non-fluorinated carbonate" refers to a general organic compound that has at least one carbonate moiety (—O—CO—O—) in the molecule while being free of a fluorine.

A high-voltage non-aqueous electrolyte secondary battery obtainable upon initial charging of the assembly disclosed herein may preferably exhibit the effect of the inclusion of the inorganic phosphate compound and oxalatoborate-type compound and provide great battery performance in a wide temperature range. For instance, it may have a high energy density and show excellent high-rate characteristics in a low temperature environment while suffering a smaller loss of capacity even when subjected to repeated charging and discharging in a high temperature environment. Accordingly, with such features, it can be preferably used for an application that requires a high energy density and a high output density or an application where it is used over a wide temperature range, such as a high output power supply to drive a vehicle. In other words, in another aspect, the present invention provides a vehicle comprising the non-aqueous electrolyte secondary battery.

BRIEF DESCRIPTION OF DRAWINGS

FIG. 1 shows a vertical cross-sectional view schematically illustrating the non-aqueous electrolyte secondary battery according to an embodiment.

FIG. 2 shows a graph illustrating changes in capacity retention rate in a cycle test.

DESCRIPTION OF EMBODIMENTS

Preferred embodiments of the present invention are described below. Technical matters other than the matters particularly mentioned in the present description which are required for carrying out the present invention (e.g. battery components (e.g. negative electrode) not characteristic of the present invention and general production processes) are perceived as matters of design variation to a person skilled in the art based on conventional art in the pertaining field. The present invention can be implemented based on the contents disclosed in this description and common technical knowledge in the subject field.

<<Non-Aqueous Electrolyte Secondary Battery Assembly>>

The non-aqueous electrolyte secondary battery assembly disclosed herein comprises a positive electrode, a negative electrode, and a non-aqueous electrolyte solution. The positive electrode in such an assembly comprises a positive electrode active material and an ion-conductive inorganic phosphate compound, and has a maximum operating voltage of 4.3 V or higher relative to lithium metal. The non-aqueous electrolyte solution in such an assembly comprises a supporting salt, an oxalatoborate-type compound, and a non-aqueous solvent, characterized by the non-aqueous solvent being formed of a non-fluorinated solvent. Thus, other components are not particularly limited and can be suitably selected in accordance with various purposes and applications.

The respective components are described in order below.

<Positive Electrode>

The positive electrode is characterized by having an upper limit of operating voltage of 4.3 V or higher (preferably 4.5 V or higher, more preferably 4.6 V or higher, or even 4.7 V or higher) relative to lithium metal in a range of 0% SOC to 100% SOC. In general, between 0% SOC and 100% SOC, the operating voltage maximizes at 100% SOC. Thus, the maximum operating voltage of a positive electrode can be usually figured out from the operating voltage of the positive electrode at 100% SOC (i.e. in a fully charged state). In typical, the art disclosed herein can be preferably applied when the maximum operating voltage of positive electrode is 7.0 V or lower (e.g. 6.0 V or lower, 5.5 V or lower) relative to lithium metal in the range of 0% SOC to 100% SOC.

The positive electrode typically comprises a positive current collector and a positive electrode active material layer formed on the positive current collector. As the positive current collector, a conductive material formed of a highly conductive metal (e.g. aluminum, nickel, etc.) is preferable. The positive electrode active material layer comprises at least a positive electrode active material and an inorganic phosphate compound. That is, a positive electrode active material and an inorganic phosphate compound are included separately and independently in the positive electrode. By this means, the increase in resistance can be reduced during charging and discharging when compared to an embodiment where the positive electrode active material and inorganic phosphate compound are included as a composite in the positive electrode.

As the positive electrode active material, one, two or more species can be used among various materials known to be usable in a positive electrode showing an aforementioned operating voltage, without particular limitations. In other words, such a high-voltage positive electrode can be obtained by the use of a positive electrode having a maximum value of operating voltage of 4.3 V or higher relative to lithium metal in the SOC range of 0% to 100%. It is particularly preferable to use a positive electrode active material having an operating voltage above 4.3 V relative to lithium metal, or preferably at or above 4.5 V, more preferably at or above 4.6 V, or even at or above 4.7 V. A preferable example showing such a property is a spinel lithium manganese composite oxide.

A particularly preferable embodiment is a lithium nickel manganese composite oxide represented by the next general formula (2):

$$\text{Li}_x(\text{Ni}_y\text{Mn}_{2-y-z}\text{M}_z)\text{O}_{4+\alpha}\text{X}^1_q \qquad (2)$$

Herein, M may be absent, or may be an arbitrary transition metal or main group metal excluding Ni and Mn (e.g. one, two or more species selected among Ti, Cr, Fe, Co, Cu, Zn and Al). Alternatively, it may be a metalloid (e.g. one, two or more species selected among B, Si, and Ge) or a non-metal. In addition, x, y, and z are values that satisfy $0.8 \leq x \leq 1.2$, $0 < y$, $0 \leq z$, and $y+z<2$ (typically $y+z \leq 1$), respectively; a is a value that achieves electrical neutrality while satisfying $-0.2 \leq \alpha \leq 0.2$; and q meets $0 \leq q \leq 1$. When q is larger than 0, $X^1$ may be F or Cl.

In a preferable embodiment, y meets $0.2 \leq y \leq 1.0$ (more preferably $0.4 \leq y \leq 0.6$, e.g. $0.45 \leq y \leq 0.55$). This can bring about the effect of the present invention to a higher level.

In another preferable embodiment, z meets $0 \leq z < 1.0$ (e.g. $0 \leq z \leq 0.1$). This can bring about the effect of the present invention to a higher level.

Specific examples of the lithium nickel manganese composite oxide represented by the general formula (2) include $\text{LiNi}_{0.5}\text{Mn}_{1.5}\text{O}_4$, $\text{LiNi}_{0.5}\text{Mn}_{1.45}\text{Ti}_{0.05}\text{O}_4$, $\text{LiNi}_{0.45}\text{Fe}_{0.05}\text{Mn}_{1.5}\text{O}_4$, $\text{LiNi}_{0.475}\text{Fe}_{0.025}\text{Mn}_{1.475}\text{Ti}_{0.025}\text{O}_4$, etc.

The lithium manganese composite oxide (e.g. a lithium nickel manganese composite oxide) preferably accounts for 50% by mass or more (typically 80 to 100% by mass, e.g. 90 to 100% by mass) of the total positive electrode active material used. It is more preferable that the positive electrode active material essentially consists of a lithium manganese composite oxide.

The properties of the positive electrode active material are not particularly limited while it is preferably in a form of particles having an average particle diameter (secondary particle diameter) of 20 μm or smaller (typically 1 μm to 20 μm, e.g. 5 μm to 10 μm). It is usually suitable that the positive electrode active material has a BET specific surface area of about 0.1 m²/g to 10 m²/g. For instance, it can be about 0.5 m²/g to 5 m²/g.

In the present description, the term "average particle diameter" refers to a particle diameter value ($D_{50}$ or a median diameter) corresponding to the 50th percentile when cumulated from the smallest particle size with respect to a certain particle size distribution by volume based on general laser diffraction/light scattering spectroscopy.

In this description, the term "BET specific surface area" refers to a surface area measured by the BET method (e.g. one point BET method) using nitrogen gas.

Based on the studies by the present inventors, when a positive electrode active material comprises a metal (typically a transition metal, especially manganese) as a component, the metal often dissolves out from the positive electrode active material at a high voltage, leading to deterioration of the positive electrode active material. According to the art disclosed herein, however, the inclusion of an inorganic phosphate compound in the positive electrode produces at least one of the following effects:

(1) Decomposition (hydrolysis) of the non-aqueous electrolyte solution (typically the supporting salt contained in the electrolyte solution, e.g. $\text{LiPF}_6$) is inhibited at a high voltage;

(2) Hydrofluoric acid (HF) produced by hydrolysis of the supporting salt (e.g. $\text{LiPF}_6$) is trapped (or consumed) in the inorganic phosphate compound to neutralize the acidity (pH) of the non-aqueous electrolyte solution; and (3) Upon charging and discharging, a coating (e.g. a LiF-containing layer) that is stable and shows relatively low resistance is formed on the surface of the positive electrode active material.

This can bring about a non-aqueous electrolyte secondary battery in which dissolution of a constituent metal from the positive electrode active material is greatly prevented.

As the inorganic phosphate compound, any ion-conductive phosphate can be used without particular limitation. Preferable examples showing such a property include inorganic solid electrolytic materials known to serve as electrolytes in all-solid batteries. In particular, when the charge carrier is lithium ions ($\text{Li}^+$), examples include phosphate-based lithium-ion-conductive substances such as $\text{Li}_3\text{PO}_4$, LiPON (lithium phosphate oxynitride), LAGP (lithium aluminum germanium phosphate; $\text{Li}_{1.5}\text{Al}_{0.5}\text{Ge}_{1.5}(\text{PO}_4)_3$), etc.; NASICON-type lithium-ion-conductive substances such as $\text{Li}_{1.5}\text{Al}_{0.5}\text{Ge}_{1.5}(\text{PO}_4)_3$, etc.; perovskite-type lithium-ion-conductive substances; thio-LISICON-type lithium-ion-conductive substances; and the like. It is noted that while the charge carrier is $\text{Li}^+$ in the examples given above, the charge carrier can be other cations (typically alkali metal ions such as $\text{Na}^+$, $\text{K}^+$, etc.; ions of Group 2 elements (typically alkaline earth metal ions) such as $\text{Mg}^{2+}$, $\text{Ca}^{2+}$, etc.). Among them, for the great acid-trapping (consuming) abilities, a phosphate comprising an alkali metal or a Group 2 element is preferably used, with examples including $\text{Li}_3\text{PO}_4$, $\text{Na}_3\text{PO}_4$, $\text{K}_3\text{PO}_4$, $\text{Mg}_3(\text{PO}_4)_2$, $\text{Ca}_3(\text{PO}_4)_2$ and the like.

The acid-trapping ability of an inorganic phosphate compound can be assessed, for instance, by the following method: The subject compound is added to an aqueous hydrochloric acid solution at 0.01 mol/L (pH≈2). Subsequently, while stirring the aqueous solution, changes in pH over time are measured. From the pH ($\text{pH}_d$) measured at 60 minutes, the pH ($\text{pH}_b$, herein $\text{pH}_b \approx 2$) of the aqueous hydrochloric acid solution used is subtracted to determine the pH difference ($\Delta\text{pH} = \text{pH}_a - \text{pH}_b$). A compound considered having a great acid-trapping (consuming) ability will have a pH difference of at least 0.1. In a preferable embodiment, $\Delta\text{pH}$ is 1 or greater, or more preferably 3 or greater. Such a compound can be thought to have a great acid-trapping ability. For instance, when the initial pH is adjusted to 2.0, a compound having a pH of 2.1 or higher (preferably 3.0 or higher, more preferably 5.0 or higher) at 60 minutes can be preferably used. The pH value refers to a pH at a liquid temperature of 25° C.

The physical characteristics of the inorganic phosphate compound are not particularly limited. From the standpoint of forming highly conductive paths in the positive electrode active material layer or in view of the consistent quality, it is favorable to be in a form of particles having an average particle diameter (secondary particle diameter) of about 1 µm to 15 µm (typically 2 µm to 10 µm). For instance, the average particle diameter can be approximately equal to that of the positive electrode active material (about 0.8 to 1.2 times the average particle diameter of the positive electrode active material particles). From the standpoint of producing a high level of the effect (2) described earlier, the inorganic phosphate compound usually has a BET specific surface area of suitably about 5 $m^2/g$ to 50 $m^2/g$, typically 10 $m^2/g$ to 40 $m^2/g$, for instance, about 20 $m^2/g$ to 30 $m^2/g$.

The inorganic phosphate compound content in the positive electrode is usually suitably 0.5 part by mass or greater, but 10 parts by mass or less relative to 100 parts by mass of the positive electrode active material. In typical, it can be 0.5 part by mass or greater, but 5 parts by mass or less, for instance, 1 part by mass or greater, but 3 parts by mass or less. The inorganic phosphate compound at 0.5 part by mass or greater can sufficiently bring about the effect of the added inorganic phosphate compound (i.e. the effect of increasing the durability (structural stability) of the positive electrode active material or the battery durability). With the addition of the poorly conductive inorganic phosphate compound in a minimum possible amount, the increase in resistance can be reduced in the positive electrode active material layer.

In addition to the positive electrode active material and inorganic phosphate compound, the positive electrode active material layer may comprise, as necessary, one, two or more species of materials that can be used as components of a positive electrode active material layer in a general non-aqueous electrolyte secondary battery. Examples of such materials include a conductive material and a binder. Preferable examples of the conductive material include carbon materials such as carbon black (typically acetylene black, Ketjen black), activated carbon, graphite, carbon fibers, and the like. Preferable examples of the binder include halogenated vinyl resins such as polyvinylidene fluoride (PVdF), etc.; polyalkylene oxides such as polyethylene oxide (PEO), etc.; and the like. As far as the effect of the present invention is not significantly impaired, various additives (e.g. an inorganic compound that produces a gas when overcharged, dispersant, thickener, etc.) can be further included.

From the standpoint of bringing about a high energy density, the positive electrode active material content is suitably about 50% by mass or greater (typically 50 to 95% by mass) of the total solid content of the positive electrode active material layer. It can be usually about 80 to 95% by mass. In the positive electrode active material layer, the inorganic phosphate compound content can be, for instance, about 0.1 to 5% by mass of the total solid content, or usually about 0.5 to 3% by mass (e.g. 2 to 3% by mass). When a conductive material is used, the conductive material content of the total solid content in the positive electrode active material layer can be, for instance, 1 to 20% by mass, or usually favorably about 1 to 10% by mass (e.g. 5 to 10% by mass). A conductive material content at 1% by mass or greater can bring about a positive electrode active material layer having excellent electron conductivity. By this, the internal resistance can be reduced to produce great input/output performance. Furthermore, a conductive material content at 20% by mass or less (preferably 10% by mass or less) can combine input/output performance with a energy density at a higher level. When a binder is used, the binder content of the total solid content in the positive electrode active material layer can be, for instance, 0.5 to 10% by mass, or usually favorably about 1 to 5% by mass. This ensures the positive electrode active material layer to have suitable mechanical strength (shape stability) to bring about great durability.

<Negative Electrode>

The negative electrode typically comprises a negative current collector and a negative electrode active material layer formed on the negative current collector. As the negative current collector, a conductive material formed of a highly conductive metal (e.g. copper, nickel, etc.) is preferable.

The negative electrode active material layer comprises at least a negative electrode active material. The negative electrode active material can be carbon materials such as graphite, hard-to-graphitize carbon (hard carbon), easy-to-graphitize carbon (soft carbon) and the like. In particular, a graphite-based carbon material (e.g. a carbon material in which graphite accounts for 50% by mass or more of the total negative electrode active material) is preferable. In addition to the negative electrode active material, the negative electrode active material layer may comprise, as necessary, one, two or more species of materials that can be used as components of a negative electrode active material layer in a general non-aqueous electrolyte secondary battery. Examples of such materials include a binder and various additives. Examples of preferable binders include a styrene-butadiene rubber (SBR), polytetrafluoroethylene (PTFE), etc. As a thickener, for instance, cellulose-based materials such as carboxymethyl cellulose (CMC) are preferable.

<Non-Aqueous Electrolyte Solution>

The non-aqueous electrolyte solution is present in a liquid state typically at ambient temperature (e.g. at 25° C.) and preferably constantly in the temperature range of use (e.g. –30° C. to 60° C.). A preferable non-aqueous electrolyte solution comprises a supporting salt (e.g. a lithium salt in a lithium-ion secondary battery) and an oxalatoborate-type compound in a non-aqueous solvent.

As the supporting salt, any salt containing a charge carrier (e.g. lithium ions, sodium ions, magnesium ions, etc.; lithium ions in a lithium-ion secondary battery) can be suitably selected and used among those used in general non-aqueous electrolyte secondary batteries. For instance, when the charge carrier is lithium ions, lithium salts such as $LiPF_6$, $LiBF_4$ and the like can be cited as examples. The supporting salt concentration in the non-aqueous electrolyte solution can be, for instance, about 0.7 mol/L to 1.3 mol/L.

In the art disclosed herein, the non-aqueous solvent is formed of a non-fluorinated solvent. By this means, for instance, the viscosity of the non-aqueous electrolyte solution can be kept low even in a low temperature environment. As a result, while the ion conductivity is maintained at a high level, the internal resistance can be reduced. Thus, even in a low temperature environment, excellent output performance can be produced. As for the non-aqueous solvent, besides being not fluorinated, there are no particular limitations, and various organic solvents known to be usable in non-aqueous electrolyte secondary batteries can be considered. Specific examples include non-fluorinated carbonates, ethers, esters, nitriles, sulfones, lactones and so on. Among these, a carbonate having a wide oxidation potential window (having a high oxidation potential) is preferable. This allows for greater inhibition of oxidative decomposition of the non-aqueous solvent, thereby producing the effect of the present invention to a higher level.

In a more preferable embodiment, the non-aqueous solvent comprises a non-fluorinated cyclic carbonate and a non-fluorinated acyclic carbonate. Due to a relatively high dielectric constant, the cyclic carbonate may advantageously increase the electric conductivity of the electrolyte solution. Because of a relatively low viscosity, the acyclic carbonate (preferably a linear carbonate) may advantageously cause the non-aqueous electrolyte solution to be in a liquid state in an environment at a low temperature (e.g. at or below 0° C.) or decrease the viscosity of the non-aqueous electrolyte solution. The use of a mixture of these two different non-aqueous solvents can make a non-aqueous electrolyte solution combining the two features at a high level.

The cyclic carbonate content (volume ratio) in the total non-aqueous solvent can be usually below 50% by volume, for instance, 20 to 40% by volume. The acyclic carbonate content (volume ratio) in the total non-aqueous solvent can be usually 50% by volume or greater, for instance, 60 to 80% by volume. This can preferably bring about a non-aqueous electrolyte solution having good electric conductivity and low viscosity.

A preferable non-fluorinated (fluorine-free) cyclic carbonate has a relatively small molecular weight. Preferable examples include ethylene carbonate (EC), vinylene carbonate (VC), and propylene carbonate (PC). Preferable examples of the non-fluorinated (fluorine-free) acyclic carbonate include dimethyl carbonate (DMC), diethyl carbonate (DEC) and ethyl methyl carbonate (EMC).

The oxalatoborate-type compound is an oxalatoborate-type complex having a four-coordinate structure with at least one oxalate ion ($C_2O_4^{2-}$) coordinating to boron (B) as the central atom. According to the studies by the present inventors, when a high-voltage positive electrode comprising an ion-conductive inorganic phosphate compound is included along with a non-aqueous electrolyte solution comprising a non-fluorinated non-aqueous solvent, cycle characteristics often show an unusual deterioration trend. However, according to the art disclosed herein, such decreases in capacity retention rate can be significantly reduced.

While the mechanism for this is currently studied, the present inventors presume as follows: During initial charging, an oxalatoborate-type compound undergoes reductive decomposition on the negative electrode surface to form a coating thereon. At the same time, some of the decomposition product(s) of the oxalatoborate-type compound moves to the positive electrode side to form a coating on the positive electrode surface as well. By this means, even in a high temperature environment, stable interfaces can be maintained among the positive electrode and/or negative electrode (more specifically the positive electrode active material and/or negative electrode active material) and the non-aqueous electrolyte solution. The battery durability may increase as a result.

In a preferable embodiment, the oxalatoborate-type compound is a compound represented by the next general formula (1):

In the formula (1), $A^+$ is an alkali metal cation, that is, $Li^+$, $Na^+$, $K^+$, etc.; X is a halogen atom, that is, F, Cl, Br, I, etc.; and n is 1 or 2.

In particular, X is favorably the most electronegative F. This can bring about the effect of the present invention even when added in a small amount and make a non-aqueous electrolyte secondary battery with excellent output performance. When the charge carrier is lithium ions, A is favorably Li. For instance, specific examples where A is Li and X is F include lithium difluoro(oxalato)borate (LiDFOB) represented by the chemical formula (I) below and lithium bis(oxalato)borate (LiBOB) represented by the chemical formula (II) below. In particular, LiDFOB is preferable since it can produce a great effect in a smaller amount.

[Chem 1]

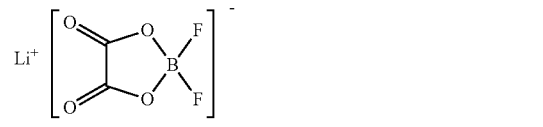

[Chem 2]

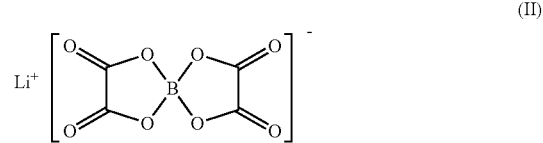

With respect to a preferable oxalatoborate-type compound content, there are no particular limitations as it may vary depending on, for instance, the type and properties of positive electrode active material, properties of positive electrode, etc. Relative to the total non-aqueous electrolyte solution, it can be usually 0.1% by mass or greater, or typically 0.5% by mass or greater, for instance, 1% by mass or greater. By this, the effect of the present invention can be appropriately produced. The upper limit of oxalatoborate-type compound content can be usually 5% by mass or less, or typically 3% by mass or less, for instance, 2% by mass or less. This can minimize the increase in resistance and bring about excellent input/output performance.

<<Non-Aqueous Electrolyte Secondary Battery>>

A non-aqueous electrolyte secondary battery assembly as described above is subjected to at least one cycle of charging (initial charging) to produce a non-aqueous electrolyte secondary battery disclosed herein.

Typically, in the charging cycle, an external battery is first connected between the positive and negative electrodes of the assembly, and an electric current is then allowed to flow until the voltage across the positive and negative electrodes reaches a prescribed value. The charging can be carried out in a constant-current mode where charging is continued at a constant current to the prescribed voltage or in a constant-current constant-voltage mode where after constant-current charging, charging is continued at a prescribed voltage for a certain period of time. The charging rate can be, for instance, about 1/100 C to 5 C (preferably 1/10 C to 1 C). The voltage (typically the highest voltage reached) across the positive and negative electrodes may depend on the positive electrode active material, non-aqueous solvent, etc. For instance, it can be about 4.5 V to 5.5 V. In this step, the number of cycles of charging can be just one; or two or more cycles can be repeated, for instance, with intermittent discharging cycle(s).

Due to the charging, the oxalatoborate-type compound in the non-aqueous electrolyte solution may partially or entirely undergo electrolysis to form a coating deposited on the active material surfaces. It typically undergoes reductive decomposition at the negative electrode. A stable coating containing boron (B) (typically in a three-coordinate structure with three oxygen (O) atoms coordinating to boron (B) as the central atom) may be deposited (accumulated, adsorbed, etc.) onto the surface of the negative electrode active material. Some of the products (e.g. fluoride ions, oxalate ions) formed by the reductive decomposition move to the positive electrode side and are deposited as a coating on the surface of the positive electrode active material. This may stabilize the interfaces among the electrode active materials and the non-aqueous electrolyte solution. As a result, a non-aqueous electrolyte secondary battery can be obtained with great oxidation resistance as well as excellent reduction resistance. Thus, the durability (e.g. high temperature cycle characteristics) can be further increased.

The amount of oxalatoborate-type compound used in constructing a non-aqueous electrolyte secondary battery (the amount of oxalatoborate-type compound supplied into the battery case) can be determined, for instance, by a general ICP (inductively coupled plasma) optical emittance spectrometry technique.

More specifically, a battery is first disassembled; and the positive and negative electrodes (positive and negative electrode active material layers) and separator are collected, immersed in and washed with a suitable solvent (e.g. EMC), and then cut out to prescribed dimensions. Such a sample is immersed in a suitable acidic solution (e.g. an aqueous sulfuric acid solution) for a certain period of time (e.g. about 1 minute to 30 minutes) to extract the subject coating component (boron, B) into the solvent. The solution is subjected to ICP emission analysis to determine the boron content (mmol). The result is extrapolated to a graph of boron content at various amounts of oxalatoborate-type compound, but otherwise under the same conditions, to estimate the amount of the compound used.

The non-aqueous electrolyte solution remaining in the battery case is then analyzed by an ion chromatography technique to quantify chemical species corresponding to the oxalatoborate-type compound and its decomposition products. Based on the results, the amount of the compound used is estimated.

These values are summed to obtain an estimate.

As described above, the oxalatoborate-type compound present at the time of construction of the assembly may be electrically decomposed during the initial charging. Thus, in the battery after charging and discharging (typically after initial charging), the oxalatoborate-type compound may or may not remain to be present in the non-aqueous electrolyte solution.

With respect to an embodiment of the present invention, an outlined constitution is described with, but not limited to, a non-aqueous electrolyte secondary battery (single cell) schematically illustrated in FIG. 1 as an example. In the drawings referenced below, a common reference numeral may be assigned to members or sites producing the same effects, and duplicate descriptions are sometimes omitted or simplified. The dimensional relationships (lengths, widths, thicknesses, etc.) in each drawing do not necessarily represent the actual dimensional relationships.

FIG. 1 shows a vertical cross-sectional view schematically illustrating a cross-sectional structure of a non-aqueous electrolyte secondary battery 100. Non-aqueous electrolyte secondary battery 100 is constituted by placing an electrode body (wound electrode body) 80 and a non-aqueous electrolyte solution (not shown in the drawing) in a battery case 50 having a shape (a flat box shape) that can house the wound electrode body, with the electrode body being formed with a long positive electrode sheet 10 and a long negative electrode sheet 20 wound flat via long separator sheets 40.

Battery case 50 comprises a flat cuboid (box-shaped) main battery casing 52 having a top opening and further comprises a lid 54 to close the opening. The top face (i.e. lid 54) of battery case 50 comprises a positive terminal 70 electrically connected to the positive electrode in wound electrode body 80 for external connection and a negative terminal 72 electrically connected to the negative electrode in wound electrode body 80. Similarly to a battery case of a conventional non-aqueous electrolyte secondary battery, lid 54 comprises a safety valve 55 to discharge gas produced inside the battery case 50 to the outside of case 50.

Inside the battery case 50, flat wound electrode body 80 is contained along with a non-aqueous electrolyte solution not shown in the drawing. Wound electrode body 80 comprises a long sheet of positive electrode (positive electrode sheet) 10 and a long sheet of negative electrode (negative electrode sheet) 20. Positive electrode sheet 10 comprises a length of positive current collector and a positive electrode active material layer 14 formed along the length direction on at least one face (typically each face) thereof. Negative electrode sheet 20 comprises a long length of negative current collector and a negative electrode active material layer 24 formed along the length direction on at least one surface (typically each face) thereof. Between positive electrode active material layer 14 and negative electrode active material layer 24, two long sheets of separator 40 are placed as insulating layers to prevent direct contacts between the two. Separator 40 should insulate the positive and negative electrodes from each other while having an ability to retain the non-aqueous electrolyte solution and shut-down function. Preferable examples include a porous resin sheet (film) formed of a resin such as polyethylene (PE), polypropylene (PP), polyester, cellulose, polyamide, etc.

In the central region in the width direction of wound electrode body 80, there is formed a wound core where the positive electrode active material layer 14 formed on the positive current collector surface and negative electrode active material layer 24 formed on the negative current collector surface are overlaid in dense layers. The width direction is defined to extend from one end to the other end of the winding axis of wound electrode body 80. On the two ends of the winding axis of wound electrode body 80, there are margins where a portion of positive electrode sheet 10 which is free of the positive electrode active material layer and a portion of negative electrode sheet 20 which is free of the negative electrode active material layer protrude outward from the wound core, respectively. Positive current collector and negative current collector are exposed on the positive electrode-side margin and negative electrode-side margin, respectively, and are electrically connected to positive terminal 70 and negative terminal 72, respectively.

<<Applications of Non-Aqueous Electrolyte Secondary Battery>>

The non-aqueous electrolyte secondary battery (a so-called 5 V-class battery) disclosed herein can be used in various applications. Because of the elevated operating voltage of the positive electrode active material and the effect of reduced dissolution of a constituent metal from the positive electrode, superior battery performance can be obtained as compared to a conventional one. For instance, it may combine a high energy density, high output density and great durability at a higher level. It can be thus preferably used in various applications. By the benefit of these features, it can be particularly preferably used in an application requiring a high energy density, high input/output densities and great durability. Such applications include motor-driving power supplies installed in vehicles such as plug-in hybrid automobiles, hybrid automobiles, electric mobiles, etc. Such a non-aqueous electrolyte secondary battery can be used typically in a form of a multi-cell system in which several cells are connected in a series and/or in parallel.

Some worked examples related to the present invention are described below. The present invention is not, however, limited to these worked examples.

<Non-Aqueous Electrolyte Secondary Battery (Example 1)>

As a positive electrode active material, was obtained $LiNi_{0.5}Mn_{1.5}O_4$ (average particle diameter: 6 μm, BET specific surface area: 0.7 m$^2$/g). The positive electrode active material, acetylene black (AB, available from Denka Kagaku Kogyo K.K., trade name "DENKA BLACK® HS-100") as a conductive material, and polyvinylidene fluoride (PVdF) as a binder were weighed out to a mass ratio of these materials, $LiNi_{0.5}Mn_{1.5}O_4$:AB:PVdF, of 87:10:3, and mixed well with N-methyl-2-pyrrolydone (MNP) while adjusting the viscosity to prepare a slurry for forming positive electrode active material layers. The slurry was applied to a surface of aluminum foil (positive current collector), dried and then roll-pressed to fabricate a positive electrode (Example 1) having a positive electrode active material layer on the positive current collector.

With the resulting positive electrode, a non-aqueous electrolyte secondary battery was constructed and tested for initial properties and cycle characteristics. More specifically, a natural graphite-based material (C, average particle diameter: 20 μm, BET specific surface area: 4 m$^2$/g, lattice constant ($C_0$): 0.67 nm, crystal size ($L_C$): 27 nm, graphitization degree: ≥0.9) as a negative electrode active material, a styrene-butadiene copolymer (SBR) as a binder and carboxymethyl cellulose (CMC) as a thickener were weighed out to a mass ratio of these materials, C:SBR:CMC, of 98:1:1, and mixed well with ion-exchanged water while adjusting the viscosity to prepare a slurry for forming negative electrode active material layers. The slurry was applied to a surface of copper foil (negative current collector), dried and then roll-pressed to fabricate a negative electrode having a negative electrode active material layer on the negative current collector. When applying the slurry, the coating amount was adjusted so that the ratio of theoretical positive electrode capacity to theoretical negative electrode capacity was 1:1.5.

The dimensions of the resulting positive electrode and negative electrode were then adjusted to a battery design capacity of 60 mAh and arranged to face each other across a separator to prepare an electrode body. As a non-aqueous electrolyte solution, in a solvent mixture containing ethylene carbonate (EC) and ethyl methyl carbonate (EMC) at 30:70 volume ratio, $LiPF_6$ was dissolved as a supporting salt to a concentration of 1.0 mol/L.

The electrode body and non-aqueous electrolyte solution were sealed in a laminate cell to construct a test battery (Example 1).

<Non-Aqueous Electrolyte Secondary Battery (Example 2)>

In this example, the positive electrode active material and $Li_3PO_4$ (available from Wako Pure Chemical Industries, Ltd., average particle diameter: 6.1 μm, BET specific surface area: 29 m$^2$/g) were mixed at 100:1 mass ratio to obtain a powder mixture. The powder mixture, conductive material and binder were weight out to a mass ratio, powder mixture: AB:PVdF, of 89:8:3. Otherwise, in the same manner as Example 1, a non-aqueous electrolyte secondary battery (Example 2) was fabricated.

<Non-Aqueous Electrolyte Secondary Battery (Example 3)>

In this example, to a solvent mixture containing monofluoroethylene carbonate (MFEC) and fluoromethyl difluoromethyl carbonate (F-DMC) at 30:70 volume ratio, $LiPF_6$ was dissolved as a supporting salt to a concentration of 1.0 mol/L. Otherwise, in the same manner as Example 2, a non-aqueous electrolyte secondary battery (Example 3) was fabricated.

<Non-Aqueous Electrolyte Secondary Battery (Example 4)>

In this example, lithium difluorobis(oxalato)phosphate (LPFO) was added at a ratio of 1.0% by mass as an additive to the non-aqueous electrolyte solution. Otherwise, in the same manner as Example 2, a non-aqueous electrolyte secondary battery (Example 4) was fabricated.

<Non-Aqueous Electrolyte Secondary Battery (Example 5)>

In this example, lithium difluoro(oxalato)borate (LiDFOB) was added at a ratio of 1.0% by mass as an additive to the non-aqueous electrolyte solution. Otherwise, in the same manner as Example 2, a non-aqueous electrolyte secondary battery (Example 5) was fabricated.

Table 1 summarizes specifications of the batteries.

[Table 1]

TABLE 1

Specifications of Non-Aqueous Electrolyte Secondary Batteries

| | Positive electrode | | Negative | Non-aqueous electrolyte solution | |
|---|---|---|---|---|---|
| | Active material | Inorganic phosphate (amount)*[1] | electrode Active material | Non-aqueous solvent | Additive (amount) *[2] |
| Ex. 1 | $LiNi_{0.5}Mn_{1.5}O_4$ | — | Natural graphite | EC, EMC | — |
| Ex. 2 | $LiNi_{0.5}Mn_{1.5}O_4$ | $Li_3PO_4$ (1 part by mass) | Natural graphite | EC, EMC | — |
| Ex. 3 | $LiNi_{0.5}Mn_{1.5}O_4$ | $Li_3PO_4$ (1 part by mass) | Natural graphite | MFEC, F-DMC | — |
| Ex. 4 | $LiNi_{0.5}Mn_{1.5}O_4$ | $Li_3PO_4$ (1 part by mass) | Natural graphite | EC, EMC | LPFO (1.0% by mass) |
| Ex. 5 | $LiNi_{0.5}Mn_{1.5}O_4$ | $Li_3PO_4$ (1 part by mass) | Natural graphite | EC, EMC | LiDFOB (1.0% by mass) |

*[1] Amount with respect to 100 parts by mass of the positive electrode active material.
*[2] Amount in the entire non-aqueous electrolyte solution.

<Measurement of Initial Capacity>

In an environment at 25° C., the resulting battery was fully charged by subjecting it to constant-current (CC) charging at a rate of 1/5 C to a positive electrode voltage of 4.9 V followed by constant-voltage (CV) charging until the current value reaches 1/50 C. Subsequently, the battery was CC-discharged at a rate of 1/5 C to a positive electrode voltage of 3.5 V and the CC discharge capacity during this was recorded as the initial capacity. The results are shown in Table 2.

<Measurement of Initial Resistance>

In an environment at 25° C., the discharged battery was CC-charged at a rate of 1/5 C to 60% SOC with the initial capacity being 100%. The battery at 60% SOC was left standing in an incubator at a temperature of 25° C. or −10° C. for two hours or longer to stabilize the battery temperature. Constant currents of 1/3 C, 1 C and 3 C were applied each for five seconds to measure overvoltage values during charging and discharging. The change in voltage (V) was divided by the corresponding current value to determine the IV resistance (Ω). The average value of IV resistance was recorded as the direct current resistance. The results are shown in Table 2.

[Table 2]

TABLE 2

| | Test Results | | | |
|---|---|---|---|---|
| | Initial properties | | | High temperature cycle characteristics |
| | Capacity | Resistance (Ω) | | Capacity retention |
| | (mAh) | 25° C. | −10° C. | rate after 200 cycles (%) |
| Ex. 1 | 60.0 | 1.46 | 5.84 | 55.9 |
| Ex. 2 | 59.1 | 2.04 | 9.54 | 0.0 |
| Ex. 3 | 57.4 | 2.00 | 10.75 | 76.7 |
| Ex. 4 | 58.2 | 1.58 | 7.36 | 22.4 |
| Ex. 5 | 58.7 | 1.79 | 8.21 | 73.0 |

From Table 2, as compared with Example 1 with a $Li_3PO_4$-free positive electrode, the initial capacities were somewhat lower and the initial resistance values were higher in Examples 2 to 5. This is presumably due to the low electron conductivity of $Li_3PO_4$. In particular, Example 3 using a fluorinated non-aqueous solvent had the lowest initial capacity and the highest initial resistance at −10° C. The charge transfer resistance is thought to have increased due to the high viscosity of the fluorinated non-aqueous solvent.

Comparing Example 2 with Examples 4 and 5, it has been found that an oxalato complex added to a non-aqueous electrolyte solution can reduce the initial resistance (e.g. resistance in a low temperature environment). This effect is thought to arise from electrical decomposition of the oxalato complex caused by initial charging and discharging. In other words, decomposition product(s) of the oxalato complex is thought to form a low resistance and stable coating on the active material surfaces.

<Test of High-Temperature Cycle Characteristics>

After the measurement of initial properties, the battery was left standing in an incubator set at a temperature of 60° C. for two hours or longer to stabilize the battery temperature. Subsequently, the battery was subjected to 200 cycles of charging and discharging with each cycle including the following operations (1) and (2):
(1) CC-charging at a rate of 2 C to 4.9 V
(2) CC-discharging at a rate of 2 C to 3.5 V The capacity retention rate (%) was determined as the ratio of discharge capacity after each cycle to discharge capacity of the first cycle by the following: capacity retention rate of Nth cycle=(discharge capacity of Nth cycle/discharge capacity of first cycle)×100(%). The results are shown in Table 2. FIG. 2 shows changes in the capacity retention rate during the high temperature cycle characteristics test.

As shown in Table 2 and FIG. 2, Example 3 using a fluorinated non-aqueous solvent showed the highest capacity retention rate (durability).

With respect to the examples using non-fluorinated non-aqueous solvents, Example 1 with a $Li_3PO_4$-free positive electrode is compared with Example 2 with a $Li_3PO_4$-containing positive electrode. In early cycles (typically about the first 100 cycles), Example 2 had higher capacity retention rates than Example 1 (FIG. 2). From this, the addition of $Li_3PO_4$ to the positive electrode is thought to have inhibited degradation of the positive electrode active material (e.g. dissolution of a component). On the contrary, in Example 2, rapid decrease of capacity retention rate (degradation) occurred in later cycles (after 100 cycles). In Example 2, the capacity retention rate dropped to 0% after 200 cycles. No such rapid degradation in later cycles was observed in Example 3 using the fluorinated non-aqueous solvent. Thus, it is evident that such degradation occurs uniquely with the use of a non-fluorinated non-aqueous solvent.

Comparing Example 2 with Examples 4 and 5, it has been found that an oxalato complex added in a non-aqueous electrolyte solution can improve high temperature cycle characteristics. In particular, Example 5 using a (oxalato) borate compound containing boron showed significantly greater cycle characteristics (durability). As a result, Example 5 had a capacity retention rate approximately equal to that of Example 3 using a fluorinated non-aqueous solvent.

Based on the results described above, it has been found that with a positive electrode comprising an inorganic phosphate and a non-aqueous electrolyte solution comprising an (oxalato)borate compound and a non-fluorinated non-aqueous solvent, a non-aqueous electrolyte secondary battery can be obtained with excellent cycle characteristics and low resistance (i.e. with both excellent input/output performance and durability). Such results indicate the technical significance of the present invention.

In particular, the ratio of the inorganic phosphate compound relative to 100 parts of positive electrode active material is favorably 0.5 to 10 parts; and (oxalato)borate compound is favorably added to the non-aqueous electrolyte solution at 0.1 to 5% by mass. By this means, a battery can be obtained, having initial resistance values of lower than 2.0Ω (preferably 1.8Ω or lower) at 25° C. and 10Ω or lower (preferably 9Ω or lower) at −10° C. while having a capacity retention rate of 60% or higher (preferably 70% or higher) at 60° C. after 200 cycles.

Although the present invention has been described in detail above, these embodiments and worked examples are merely for illustrations. The invention disclosed herein includes various modifications and changes made to the specific embodiments illustrated above.

REFERENCE SIGNS LIST

10 positive electrode sheet (positive electrode)
14 positive electrode active material layer
20 negative electrode sheet (negative electrode)
24 negative electrode active material layer
40 separator sheet (separator)
50 battery case
52 main battery casing
54 lid
55 safety valve
70 positive terminal
72 negative terminal
80 wound electrode body
100 non-aqueous electrolyte secondary battery

The invention claimed is:
1. A non-aqueous electrolyte secondary battery assembly prior to initial charging, comprising a positive electrode, a negative electrode, and a non-aqueous electrolyte solution, wherein:

the positive electrode has a maximum operating voltage of 4.3 V or higher relative to lithium metal, comprising a positive electrode active material and an ion-conductive inorganic phosphate compound, wherein the positive electrode active material comprises a spinel lithium manganese composite oxide, and the non-aqueous electrolyte solution comprises a supporting salt, an oxalatoborate-type compound, and a non-aqueous solvent, with the non-aqueous solvent being formed of a non-fluorinated solvent.

2. The non-aqueous electrolyte secondary battery assembly according to claim 1, wherein the oxalatoborate-type compound is a compound represented by the next general formula (1):

$$A^+[BX_{4-2n}(C_2O_4)_n]^- \quad (1)$$

(in the formula (1), A is alkali metal, X is halogen, and n is 1 or 2).

3. The non-aqueous electrolyte secondary battery assembly according to claim 2, wherein in the general formula (1), A is lithium (Li) and X is fluorine (F).

4. The non-aqueous electrolyte secondary battery assembly according to claim 1, wherein the oxalatoborate-type compound is lithium difluoro(oxalato)borate (LiDFOB).

5. The non-aqueous electrolyte secondary battery assembly according to claim 1, wherein the oxalatoborate-type compound content in the entire non-aqueous electrolyte solution is 0.1% by mass or greater, but 5% by mass or less.

6. The non-aqueous electrolyte secondary battery assembly according to claim 1, wherein the inorganic phosphate compound is a phosphate salt comprising an alkali metal.

7. The non-aqueous electrolyte secondary battery assembly according to claim 1, wherein the inorganic phosphate compound content is 0.5 part by mass or greater, but 5 parts by mass or less, with the positive electrode active material being 100 parts by mass.

8. The non-aqueous electrolyte secondary battery assembly according to claim 1, wherein the positive electrode active material comprises a spinel lithium nickel manganese composite oxide.

9. The non-aqueous electrolyte secondary battery assembly according to claim 8, wherein the spinel lithium nickel manganese composite oxide is a compound presented by the general formula (2):

$$Li_xNi_yMn_{2-y-z}M_z)O_{4-\alpha}X^1_q \quad (2),$$

wherein M is absent or at least one of a transition metal or main group metal excluding Ni and Mn; x, y, and z are values that satisfy $0.8 \leq x \leq 1.2$, $0.4 < y < 1.0$, $0 \leq z$, and $y+z<2$; $\alpha$ is a value that achieves electrical neutrality while satisfying $-0.2 \leq \alpha \leq 0.2$; q meets $0 \leq q \leq 1$; and when q is larger than 0, $X^1$ may be F or Cl.

10. The non-aqueous electrolyte secondary battery assembly according to claim 9, wherein in the general formula (2), y satisfies $0.4<y<0.6$.

11. The non-aqueous electrolyte secondary battery assembly according to claim 9, wherein in the general formula (2), z satisfies $0 \leq z < 1.0$.

12. The non-aqueous electrolyte secondary battery assembly according to claim 9, wherein in the general formula (2) is $LiNi_{0.5}Mn_{1.5}O_4$, $LiNi_{0.5}Mn_{1.45}Ti_{0.05}O_4$, $LiNi_{0.45}Fe_{0.05}Mn_{1.5}O_4$, or $LiNi_{0.475}Fe_{0.025}Mn_{1.475}Ti_{0.025}O_4$.

13. The non-aqueous electrolyte secondary battery assembly according to claim 1, wherein:

the non-fluorinated solvent comprises a cyclic carbonate and an acyclic carbonate, the cyclic carbonate is one, two or more species selected from a group consisting of ethylene carbonate (EC), vinylene carbonate (VC) and propylene carbonate (PC); and the acyclic carbonate is one, two or more species selected from a group consisting of dimethyl carbonate (DMC), diethyl carbonate (DEC) and ethyl methyl carbonate (EMC).

14. The non-aqueous electrolyte secondary battery assembly according to claim 1, wherein the positive electrode is characterized by having an operating voltage of 4.6 V or higher.

15. The non-aqueous electrolyte secondary battery assembly according to claim 1, wherein the positive electrode active material has an average particle diameter of 20 μm or smaller and a BET specific surface area of about 0.1 m²/g to 10 m²/g.

16. The non-aqueous electrolyte secondary battery assembly according to claim 1, wherein the inorganic phosphate compound has an average particle diameter of about 1 μm to 15 μm and a BET specific surface area of suitably about 5 m²/g to 50 m²/g.

17. The non-aqueous electrolyte secondary battery assembly according to claim 1, wherein the oxalatoborate-type compound is lithium bis(oxalato)borate (LiBOB).

18. A non-aqueous electrolyte secondary battery obtained by subjecting the non-aqueous electrolyte secondary battery assembly according to claim 1 to at least one cycle of initial charging.

* * * * *